(12) United States Patent
Takeda et al.

(10) Patent No.: US 10,952,233 B2
(45) Date of Patent: Mar. 16, 2021

(54) USER TERMINAL, RADIO BASE STATION AND RADIO COMMUNICATION METHOD

(71) Applicant: NTT DOCOMO, INC., Tokyo (JP)

(72) Inventors: Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/753,399

(22) PCT Filed: Aug. 19, 2016

(86) PCT No.: PCT/JP2016/074169
§ 371 (c)(1),
(2) Date: Feb. 19, 2018

(87) PCT Pub. No.: WO2017/033842
PCT Pub. Date: Mar. 2, 2017

(65) Prior Publication Data
US 2018/0242350 A1    Aug. 23, 2018

(30) Foreign Application Priority Data
Aug. 21, 2015    (JP) .............................. JP2015-164237

(51) Int. Cl.
*H04W 28/06* (2009.01)
*H04W 72/12* (2009.01)

(52) U.S. Cl.
CPC ....... *H04W 72/1289* (2013.01); *H04W 28/06* (2013.01); *H04W 72/1257* (2013.01); *H04W 72/1263* (2013.01)

(58) Field of Classification Search
CPC ..... H04W 84/08; H04W 72/04; H04W 88/08; H04W 76/00; H04W 28/06
See application file for complete search history.

(56) References Cited

U.S. PATENT DOCUMENTS 6,327,256 B1* 12/2001 Paivike ............... H04B 7/2659
370/337
2002/0080829 A1* 6/2002 Ofek ................... H04L 12/6418
370/539

(Continued)

FOREIGN PATENT DOCUMENTS

WO    2014/111727 A1    7/2014

OTHER PUBLICATIONS

International Search Report issued in PCT/JP2016/074169 dated Nov. 8, 2016 (1 page).

(Continued)

*Primary Examiner* — Hassan A Phillips
*Assistant Examiner* — Prenell P Jones
(74) *Attorney, Agent, or Firm* — Osha Bergman Watanabe & Burton LLP

(57) ABSTRACT

A user terminal is disclosed that communicates in a narrow band that is narrower than a minimum bandwidth for use supported in an existing LTE (Long Term Evolution) system. The user terminal includes a receiver that receives downlink control information and a controller that controls a scheduling unit of a downlink data signal and/or an uplink data signal based on command information included in the downlink control information. A radio base station is also disclosed that communicates in a narrow band that is narrower than a minimum bandwidth for use supported in an existing LTE (Long Term Evolution) system. The radio base station includes a transmitter that transmits downlink control information and a controller that controls scheduling of a downlink data signal and/or an uplink data signal, wherein the downlink control information includes command information that is used to control a scheduling unit of the downlink data signal and/or the uplink data signal.

6 Claims, 12 Drawing Sheets

(56) References Cited

U.S. PATENT DOCUMENTS

| | | | |
|---|---|---|---|
| 2003/0137993 A1* | 7/2003 | Odman | H04L 29/06 370/468 |
| 2004/0209612 A1* | 10/2004 | Barberis | H04W 24/00 455/423 |
| 2008/0192664 A1* | 8/2008 | Jiang | H04W 28/06 370/310 |
| 2009/0075628 A1* | 3/2009 | Patwardhan | H04W 12/04071 455/410 |
| 2009/0252088 A1* | 10/2009 | Rao | H04W 88/04 370/328 |
| 2010/0041408 A1* | 2/2010 | Caire | H04L 5/0007 455/446 |
| 2010/0091701 A1* | 4/2010 | Youn | H04W 48/10 370/328 |
| 2010/0091725 A1* | 4/2010 | Ishii | H04W 72/04 370/329 |
| 2011/0014908 A1* | 1/2011 | Eiza | H04W 56/0045 455/423 |
| 2012/0071190 A1* | 3/2012 | Choi | H04L 5/0037 455/517 |
| 2013/0064119 A1* | 3/2013 | Montojo | H04W 36/0061 370/252 |
| 2013/0241368 A1* | 9/2013 | Liu | H02K 11/33 310/68 D |
| 2014/0269550 A1* | 9/2014 | Webb | H04W 72/0446 370/329 |
| 2014/0376422 A1* | 12/2014 | Dai | H04W 72/042 370/280 |
| 2015/0049703 A1* | 2/2015 | Nobukiyo | H04L 5/0057 370/329 |
| 2015/0078325 A1* | 3/2015 | Kishiyama | H04L 5/143 370/330 |
| 2015/0327284 A1 | 11/2015 | Wakabayashi | |
| 2016/0081084 A1* | 3/2016 | Blankenship | H04W 4/70 370/329 |
| 2016/0088592 A1* | 3/2016 | Montojo | H04W 36/0061 370/329 |
| 2016/0305681 A1* | 10/2016 | Matsuoka | G05D 23/1904 |
| 2016/0360526 A1* | 12/2016 | Lehmann | H04L 65/4076 |
| 2017/0045864 A1* | 2/2017 | Fadell | G05D 23/1904 |
| 2017/0289957 A1* | 10/2017 | Zhang | H04W 68/02 |
| 2019/0003736 A1* | 1/2019 | Matsuoka | H04L 12/2825 |

OTHER PUBLICATIONS

Written Opinion of the International Searching Authority issued in PCT/JP2016/074169 dated Nov. 8, 2016 (3 pages).

Sony; "MTC Operation using ePDCCH"; 3GPP TSG-RAN WG1 Meeting #79, R1-145019; San Francisco, USA; Nov. 17-21, 2014 (17 pages).

3GPP TS 36.300 V12.4.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)"; Dec. 2014 (251 pages).

3GPP TR 36.888 V12.0.0; "3rd Generation Partnership Project; Technical Specification Group Radio Access Network; Study on provision of low-cost Machine-Type Communications (MTC) User Equipments (UEs) based on LTE (Release 12)"; Jun. 2013 (55 pages).

Extended European Search Report issued in the counterpart European Patent Application No. 16839189.4, dated Jul. 11, 2018 (9 pages).

Ericsson LM, et al.; "Narrowband LTE—Concept Description"; 3GPP TSG RAN WG1 Meeting #82 R1-154659; Beijing, China, Aug. 24-28, 2015 (9 pages).

Office Action issued in corresponding Japanese Patent Application No. 2015-164237, dated Nov. 1, 2016 (6 pages).

Office Action issued in the counterpart European Patent Application No. 16839189.4, dated Jun. 21, 2019(6 pages).

European Office Action issued in the counterpart European Patent Application No. 16839189.4, dated Mar. 30, 2020 (9 pages).

Office Action in counterpart European Patent Application No. 16839189.4 dated Jan. 12, 2021 (7 pages).

Ericsson LM et al; "Narrowband LTE—Downlink Control Information and Scheduling"; 3GPP TSG GERAN#67, GP-150784; Yin Chuan, China; Aug. 10-13, 2015 (7 pages).

* cited by examiner

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Also, successor systems of LTE (referred to as, for example, "LTE-A" (LTE-Advanced), "FRA" (Future Radio Access), "4G," "5G," and so on) are under study for the purpose of achieving further broadbandization and increased speed beyond LTE.

Now, accompanying the cost reduction of communication devices in recent years, active development is in progress in the field of technology related to machine-to-machine communication (M2M) to implement automatic control of network-connected devices and allow these devices to communicate with each other without involving people. In particular, 3GPP (3rd Generation Partnership Project) is promoting the standardization of MTC (Machine-Type Communication) for cellular systems for machine-to-machine communication, among all M2M technologies (see non-patent literature 2). User terminals for MTC (MTC UE (User Equipment)) are being studied for use in a wide range of fields such as, for example, electric meters, gas meters, vending machines, vehicles and other industrial equipment.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall Description; Stage 2"

Non-Patent Literature 2: 3GPP TS 36.888 "Study on provision of low-cost Machine-Type Communications (MTC) User Equipments (UEs) based on LTE (Release 12)"

SUMMARY OF INVENTION

Technical Problem

From the perspective of reducing the cost and improving the coverage area in cellular systems, in MTC, user terminals for MTC (LC (Low-Cost) MTC UEs) that can be implemented in simple hardware structures have been increasingly in demand. For these LC-MTC UEs, a communication scheme to allow LTE communication in a very narrow band is under study (which may be referred to as, for example, "NB-LTE" (Narrow Band LTE), "NB cellular IoT" (Narrow Band cellular Internet of Things), "clean slate," and so on).

User terminals that communicate in NB-LTE (hereinafter referred to as "NB-LTE terminals") are under study as user terminals having the functions to transmit/receive in a narrower band (for example, 200 kHz) than the minimum system bandwidth (1.4 MHz) that is supported in existing LTE.

However, applying the techniques of transmitting/receiving data signals (for example, the PDSCH (Physical Downlink Shared Channel), the PUSCH (Physical Uplink Shared Channel), etc.) used in existing systems to NB-LTE terminals that are limited to using a narrower band than the minimum system bandwidth in existing LTE systems as the band for their use is likely to be difficult.

The present invention has been made in view of the above, and it is therefore an object of the present invention to provide a user terminal, a radio base station and a radio communication method, whereby data signals can be transmitted and received adequately when the band for use is limited to a narrower band than the minimum system bandwidth in existing LTE systems.

Solution to Problem

According to one aspect of the present invention, a user terminal communicates in a narrow band, which is narrower than the minimum bandwidth for use supported in an existing LTE (Long Term Evolution) system, and this user terminal has a receiving section that receives downlink control information, and a control section that controls a scheduling unit of a downlink data signal and/or an uplink data signal based on command information included in the downlink control information.

Advantageous Effects of Invention

According to the present invention, data signals can be transmitted and received adequately when the band for use is limited to a narrower band than the minimum system bandwidth in existing LTE systems.

DESCRIPTION OF EMBODIMENTS

Studies are in progress to simplify the hardware structures of NB-LTE terminals at the risk of lowering their processing capabilities. For example, studies are in progress to apply limitations to NB-LTE terminals, in comparison to existing user terminals, by, for example, lowering the peak rate, limiting the transport block size (TBS), limiting the resource blocks (also referred to as "RBs," "PRBs" (Physical Resource Blocks) and so on), limiting the RFs (Radio Frequencies) to receive, and so on.

Unlike existing user terminals, in which the system band (for example, 20 MHz (100 PRBs), one component carrier, etc.) is configured as the upper limit band for use, the upper limit band for use for NB-LTE terminals is limited to a predetermined narrow band (for example, 200 kHz, 6 PRBs, etc.). Studies are in progress to run such band-limited NB-LTE terminals in LTE/LTE-A system bands, considering the relationship with existing user terminals.

For example, LTE/LTE-A system bands may support frequency-multiplexing of band-limited NB-LTE terminals and band-unlimited existing user terminals. Consequently, NB-LTE terminals may be seen as terminals, in which the maximum band they support is a partial narrow band in the minimum system band (for example, 1.4 MHz) that is supported in existing LTE, or may be seen as terminals which have the functions for transmitting/receiving in a narrower band than the minimum system band (for example, 1.4 MHz) supported in LTE/LTE-A.

Figure 1:
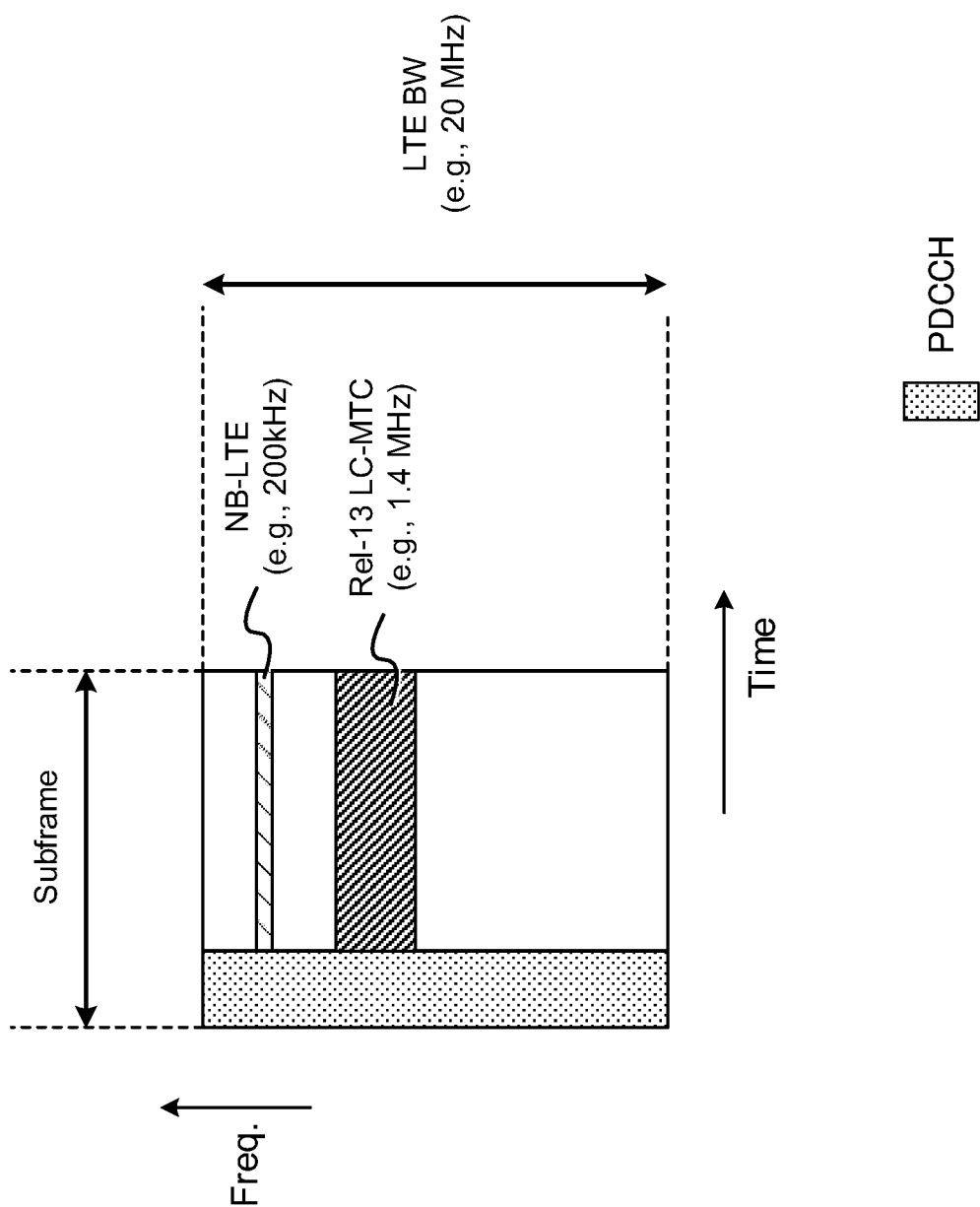
FIG. 1 is a diagram to explain the band for use for NB-LTE terminals.

FIG. 1 is a diagram to show an example of the arrangement of a narrow band in a system band. In FIG. 1, a predetermined narrow band (for example, 200 kHz), which is narrower than the minimum system band (1.4 MHz) in LTE systems, is configured in a portion of a system band. This narrow band is equivalent to a frequency band that can be detected by NB-LTE terminals. Note that the minimum system band (1.4 MHz) for LTE systems is also the band for use in LC-MTC in LTE Rel. 13.

Note that it is preferable to employ a structure, in which the frequency location of the narrow band that serves as the band for use by NB-LTE terminals can be changed within the system band. For example, NB-LTE terminals should preferably communicate by using different frequency resources per predetermined period (for example, per subframe). By this means, it is possible to achieve traffic offloading for NB-LTE terminals, achieve a frequency diversity effect, and reduce the decrease of spectral efficiency. Consequently, considering the application of frequency hopping, frequency scheduling and so on, NB-LTE terminals should preferably have an RF re-tuning function.

Note that different frequency bands may be used between the narrow band to use in downlink transmission/reception (DL NB: Downlink Narrow Band) and the narrow band to use in uplink transmission/reception (UL NB: Uplink Narrow Band). Also, the DL NB may be referred to as the "downlink narrow band," and the UL NB may be referred to as the "uplink narrow band."

NB-LTE terminals receive downlink control information (DCI) by using a downlink control signal (downlink control channel) that is placed in a narrow band, and this downlink control signal may be referred to as an "EPDCCH" (Enhanced Physical Downlink Control CHannel), may be referred to as an "MPDCCH" (MTC PDCCH), or may be referred to as an "NB-PDCCH."

Also, NB-LTE terminals receive downlink data by using a downlink data signal (downlink shared channel) that is placed in a narrow band, and this downlink data signal may be referred to as a "PDSCH" (Physical Downlink Shared CHannel), may be referred to as an "MPDSCH" (MTC PDSCH), or may be referred to as an "NB-PDSCH."

Also, an uplink control signal (uplink control channel) (for example, a PUCCH (Physical Uplink Control CHannel)) and an uplink data signal (uplink shared channel) (for example, a PUSCH (Physical Uplink Shared CHannel)) for NB-LTE terminals may be referred to as an "MPUCCH" (MTC PUCCH) and an "MPUSCH" (MTC PUSCH), respectively. The above channels are by no means limiting, and any channel that is used by NB-LTE terminals may be represented by affixing an "M," which stands for MTC, an "N," which stands for NB-LTE, or an "NB," to a conventional channel used for the same purpose.

Also, it is possible to provide SIBs (System Information Blocks) for NB-LTE UEs, and these SIBs may be referred to as "MTC-SIBs," "NB-SIBs," and so on.

Now, in NB-LTE, a study is in progress to use repetitious transmission/receipt, in which the same downlink signal and/or uplink signal are transmitted/received in repetitions over a plurality of subframes, for enhanced coverage. Note that the number of a plurality of subframes in which the same downlink signal and/or uplink signal are transmitted and received is also referred to as "the number of repetitions" (or the "repetition number"). Also, the number of repetitions may be represented by the repetition level. This repetition level is also referred to as the "coverage enhancement (CE) level."

When the techniques of transmitting/receiving data signals (for example, the PDSCH, the PUSCH, etc.) in LTE systems such as those described above are applied to NB-LTE terminals that are limited to using a narrower band than the minimum system bandwidth in existing LTE systems as the band for their use, there is a threat that data signals cannot be received adequately, the accuracy of channel estimation decreases, and so on.

Figure 2A:
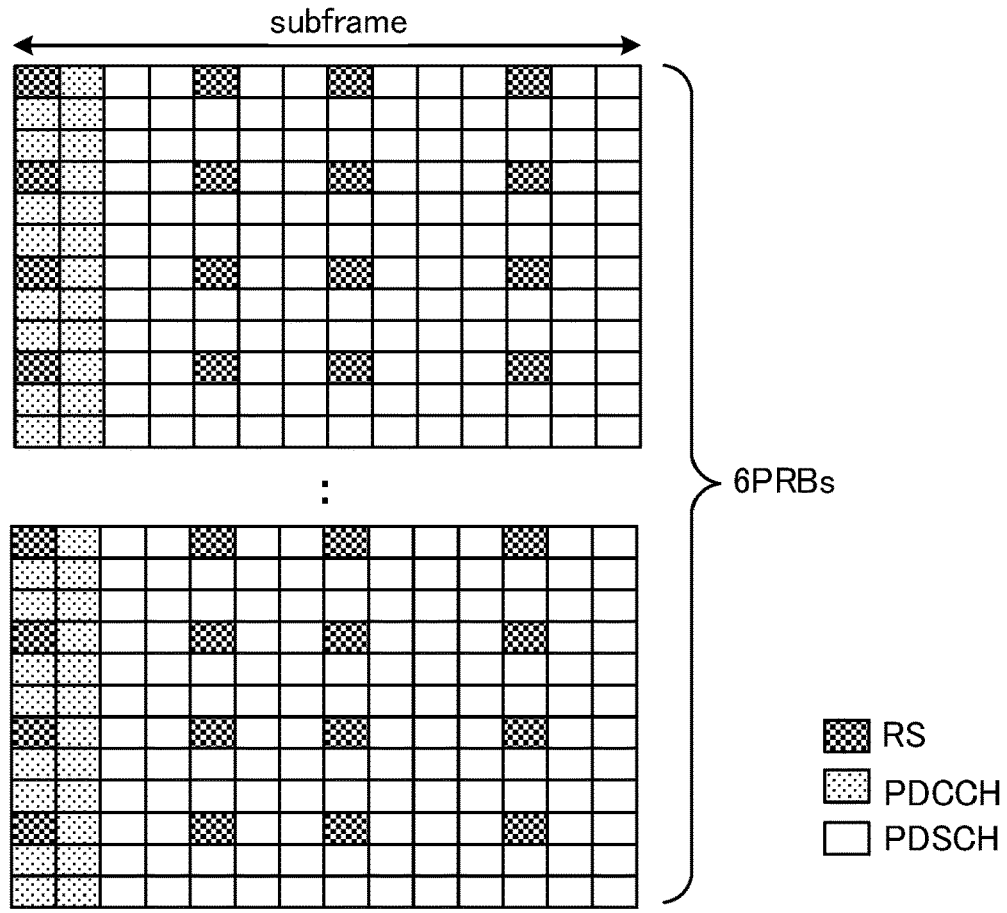
FIGS. 2A and 2B are diagrams to show examples of the arrangement of downlink signals.

FIG. 2A shows the arrangement of a downlink control signal (PDCCH), a downlink data signal (PDSCH) and a downlink reference signal when the band for use is limited to the minimum system band in LTE systems (1.4 MHz (=6 PRBs)). Meanwhile, FIG. 2B the arrangement of a downlink control signal (PDCCH), a downlink data signal (PDSCH) and a downlink reference signal when the band for use is limited to a narrower band than the minimum system band in LTE systems (200 kHz (=1 PRB)).

Figure 2B:
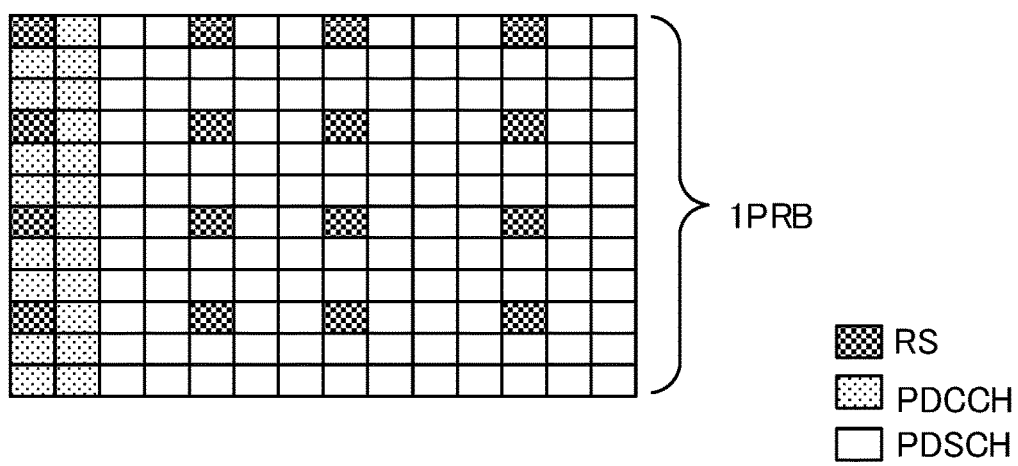

In the case illustrated in FIG. 2B, the number of resource elements that can be allocated to the downlink data signal decreases in the 1-PRB band that is used, and the transport block size (TBS) of the PDSCH becomes smaller. As a result of this, there is a threat that the PDSCH transport block (TB) is filled with the control header (for example, the MAC (Medium Access Control) header) alone, and payload (for example, user data, higher layer control information, etc.) cannot be communicated.

Also, in the case illustrated in FIG. 2B, the number of downlink reference signals in the band in use decreases in comparison to FIG. 2A, there is a fear that the accuracy of channel estimation drops.

In this way, existing techniques to arrange downlink control signals, downlink data signals and downlink reference signals in the same subframe is likely to be unsuitable when the band for use is limited to a narrower band than the minimum system bandwidth in existing LTE systems. Also, the same applies to the case where uplink data signals and uplink control signals are arranged in the same subframe.

So, the present inventors have come up with the idea that, by arranging data signals and control signals in different subframes, it may become possible to transmit/receive data signals adequately, or improve the accuracy of channel estimation, even when the band for use is limited to a narrower band (for example, 200 kHz (=1 PRB)) than the minimum system bandwidth in existing LTE systems (1.4 MHz (=6 PRBs)), and thereupon arrived at the present invention.

Now, the radio communication method according to an embodiment of the present invention will be described. Note that, in the following description, the band that is narrower than the minimum system bandwidth in existing LTE systems (1.4 MHz) will be 200 kHz and will be formed with one resource block (PRB), this is by no means limiting.

Downlink

First Example

The method of multiplexing downlink signals will be described with a first example. According to the first example, downlink reference signals and downlink data signals are time-division-multiplexed on different subframes. Also, downlink control signals are multiplexed on different subframes than downlink reference signals and downlink data signals. That is, according to the first example, downlink reference signals, downlink control signals and downlink data signals are all time-division-multiplexed on different subframes.

Figure 3:
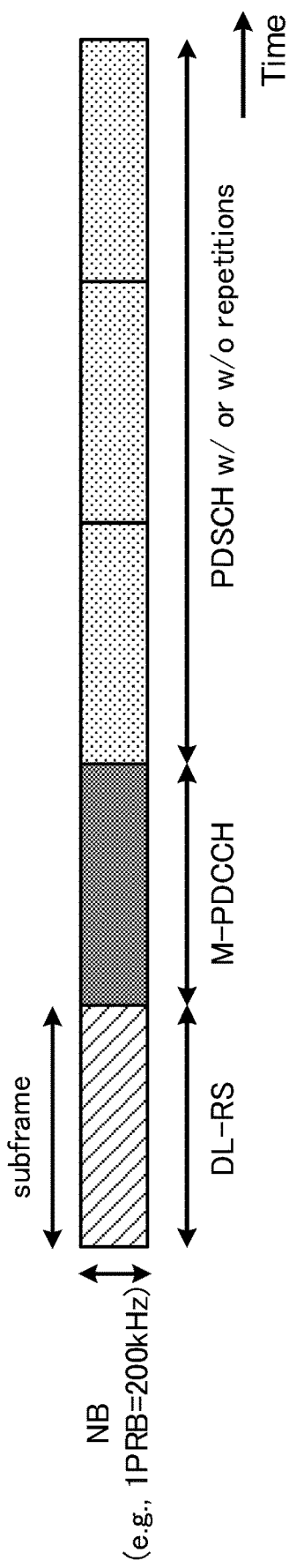
FIG. 3 is a diagram to show an example of a downlink signal multiplexing method according to a first example.

FIG. 3 shows an example in which a downlink reference signal (DL-RS), a downlink control signal (M-PDCCH) and a downlink data signal (PDSCH) are all time-division-multiplexed on different subframes. As shown in FIG. 3, by arranging a downlink reference signal, a downlink control signal and a downlink data signal in different subframes, it is possible to increase the number of resource elements where the downlink data signal can be allocated, so that the TBS can be expanded. Furthermore, since the number of locations where the downlink reference signal can be arranged increases, it is possible to prevent the accuracy of channel estimation from dropping.

In FIG. 3, the downlink reference signal (DL-RS) is at least one of the cell-specific reference signal (CRS), the channel state information reference signal (CSI-RS), the demodulation reference signal (DMRS) that is used to demodulate the PDSCH or the M-PDCCH, the cell discovery signal (DRS: Discovery Reference Signal), and the synchronization signal (SS, including the primary synchronization signal (PSS) and the secondary synchronization signal (SSS)).

In the subframe for the downlink reference signal in FIG. 3, at least one of the CRS, the CSI-RS, the DM-RS and the SS can be arranged in higher density than conventional density.

Also, the number of subframes for the downlink reference signal (in FIG. 3, one subframe) may be controlled based on the number of antenna ports (APs), the coverage requirement, and so on. Note that the number of subframes for the downlink reference signal may be reported (configured) to NB-LTE terminals by using higher layer signaling (for example, RRC (Radio Resource Control) signaling, broadcast information, etc.), or by using downlink control information (DCI).

Furthermore, referring to FIG. 3, the channel coding of the downlink data signal (PDSCH) may be executed by using convolutional coding, instead of turbo coding for LTE systems. In cases like this where the TBS is small, improvement of performance can be achieved by using convolutional coding.

Furthermore, the downlink data signal may be transmitted with repetition over a plurality of subframes, or may be transmitted without repetition. Also, when a plurality of subframes are used, the same data may be transmitted with repetition for enhanced coverage, or the same data may be mapped to a plurality of subframes by expanding the TBS, for improved throughput.

Also, rate matching may be applied to the downlink data signal based on the presence of the CRS in subframes where the downlink data signal is multiplexed. However, since it might occur that the CRS is not arranged in future radio communication systems, information to indicate the presence of the CRS may be reported to NB-LTE terminals by using higher layer signaling, or by using downlink control information. A user terminal may control the receipt (for example, decoding) of the downlink data signal based on the presence of the CRS.

According to the first example, a downlink reference signal, a downlink control signal and a downlink data signal are arranged in different subframes, so that it is possible to increase the number of resource elements to which the downlink data signal can be allocated. As a result of this, the TBS can be expanded even when the band for use is limited to a narrower band than the minimum system band in LTE systems, so that downlink user data can be communicated adequately. Furthermore, since the number of locations where the downlink reference signal can be arranged increases, it is possible to prevent the accuracy of channel estimation from dropping.

<Variation>

In the first example described above, the downlink control signal is multiplexed on a different subframe from those of the downlink reference signal and the downlink data signal. By contrast with this, according to a variation, the downlink control signal is multiplexed on the same subframe with the downlink reference signal.

If the band for use for NB-LTE terminals is limited to a narrower band than the minimum system band in LTE systems, it is possible that scheduling, adaptive modulation and coding and so on are not applied to the downlink data signal. In this case, the downlink control signal's overhead might decrease. So, with this variation, the downlink control signal is multiplexed on the same subframe with the downlink reference signal.

Figure 4:
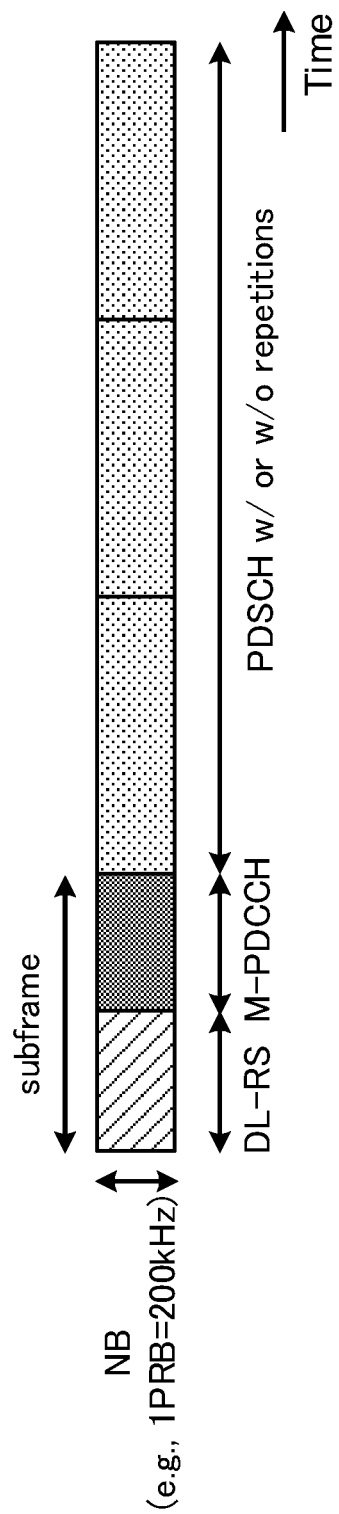
FIG. 4 is a diagram to show an example of a downlink signal multiplexing method according to variation of the first example.

FIG. 4 shows an example in which the downlink control signal (M-PDCCH) is multiplexed on the same subframe example as downlink reference signal (DL-RS). For example, when TM (Transmission Mode) 9 or 10, which is a DM-RS-based transmission mode, is configured, although the DM-RS is arranged and transmitted in the same subframe with the M-PDCCH, the DM-RS is not transmitted in the subsequent PDSCH subframes. Note that, referring to FIG. 4, the downlink reference signal and the downlink control signal may be time-division-multiplexed in the same subframe, or may be frequency-division-multiplexed. By multiplexing the downlink reference signal and the downlink control signal on the same subframe, it is possible to increase the number of radio resources that can be allocated to the downlink data signal even more.

Second Example

With a second example, the scheduling unit of downlink data signals will be described. The second example can be combined with the first example and with its variation.

Figure 5A:
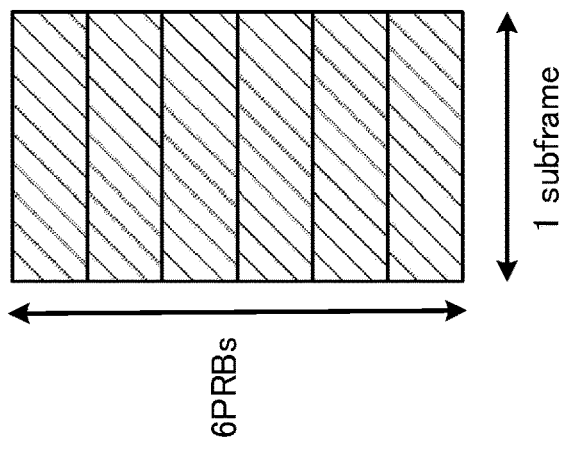
FIG. 5A and FIG. 5B provide diagrams to explain the scheduling unit according to a second example.

FIG. 5 is a diagram to explain the scheduling unit of downlink data signals. As shown in FIG. 5A, the unit of scheduling unit existing LTE systems is one subframe. If the minimum system band in existing LTE systems (1.4 MHz) is made the band for use, maximum 6 PRBs are allocated in one subframe, which is the unit of scheduling.

Figure 5B:
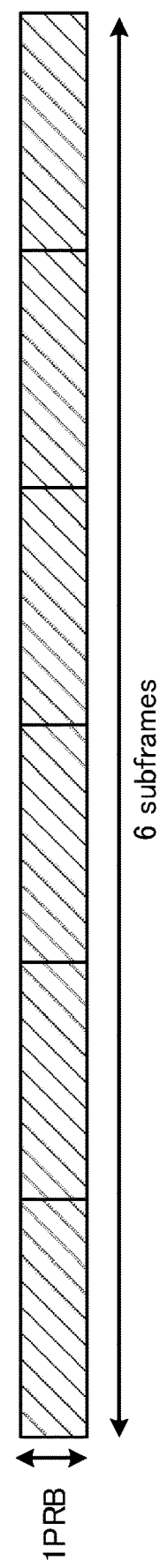

On the other hand, assuming the case where band for use for NB-LTE terminals is limited to a narrower band (200 kHz (=1 PRB)) than the minimum system band in existing LTE systems (1.4 MHz), a study is in progress to place 6 PRBs side by side, as shown in FIG. 5B, so as to make these 6 subframes the unit of scheduling. By using 6 subframes, which are 6 PRBs placed side by side in the direction of time, as the unit of scheduling, it is possible to simplify the scheduling of control.

However, when the scheduling unit is fixed to 6 subframes, there is a fear that the attempt to communicate data of small packet size results in less efficient use of radio resources. To be more specific, when the unit of scheduling is comprised of 6 subframes, there is a fear that the TBS may be too large for the data that is to be transmitted. Consequently, it is preferable to form the scheduling unit flexibly, with 6 or fewer multiple subframes.

So, according to the second example, the scheduling unit of downlink data signals is formed with 6 or fewer multiple subframes, and this scheduling unit is controlled on a dynamic basis. For example, NB-LTE terminals switch the downlink data signal scheduling unit from 6 subframes to a smaller number of subframes than 6 subframes.

Also, NB-LTE terminals may switch the scheduling unit based on command information to command switch of the scheduling unit, based on the modulation and coding scheme (MCS) index for the downlink data signal, or based on the transport block size (TBS) of the downlink data signal. Note that the command information and the MCS index may be included in DCI. The TBS may be specified based on the MCS index.

Figure 6:
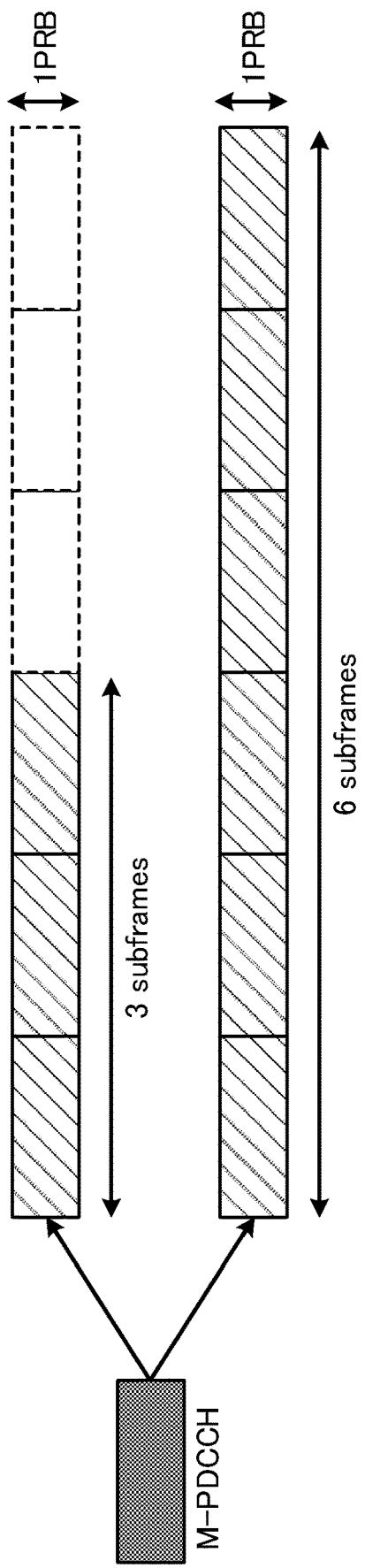
FIG. 6 is a diagram to explain the control of the scheduling unit according to the second example.

FIG. 6 is a diagram to show an example of dynamic control of scheduling units. FIG. 6 shows an example in which a 3-subframe scheduling unit and a 6-subframe scheduling unit are controlled dynamically. Note that the scheduling unit is not limited to being 3 subframes or 6 subframes, and has only to be 6 or fewer subframes.

Also, according to the second example, the scheduling unit can b e switched to 6 or fewer multiple subframes, so that it is possible to prevent the situation where the attempt to communicate data of small packet size results in less efficient use of radio resources.

Uplink

The downlink signal multiplexing method that has been described above as the first example (including the variation) is can be applied to uplink signals. Furthermore, the control of the downlink signal scheduling unit that has been described above as the second example can be applied to uplink signals as well. Differences from the downlink will be described below.

Figure 7:
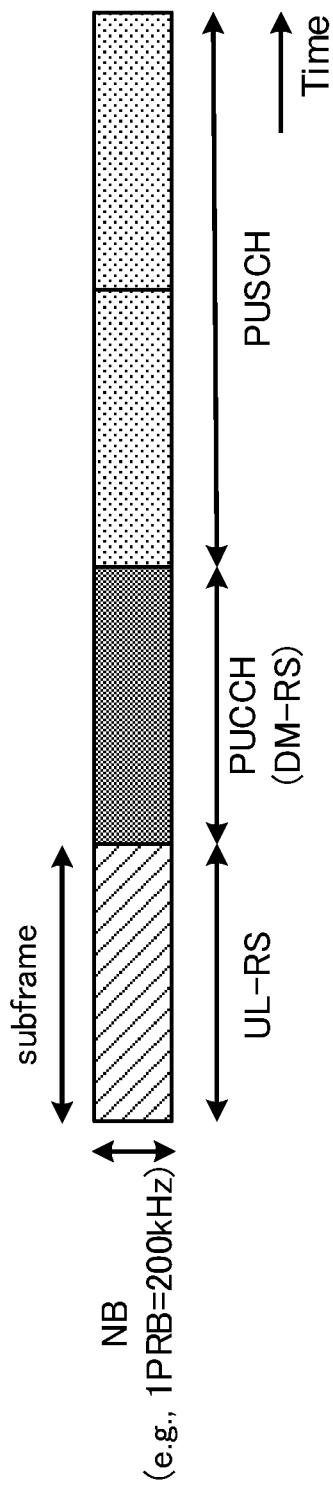
FIG. 7 is a diagram to show an example of an uplink signal multiplexing method.

As shown in FIG. 7, an uplink reference signal and an uplink data signal (for example, the PUSCH) are time-division-multiplexed on different subframes. An uplink control signal (for example, the PUCCH) may be multiplexed on a different subframe from those of the uplink reference signal and the uplink data signal, as shown in FIG. 7, or may be multiplexed on a different subframe from those of the uplink reference signal and the uplink data signal.

In FIG. 7, the uplink reference signal (UL-RS) is at least one of the sounding reference signal (SRS), and the demodulation reference signal (DMRS) that is used to demodulate the uplink data signal.

Also, as shown in FIG. 7A, the uplink control signal may be multiplexed with the demodulation reference signal (DMRS) for use for demodulating this uplink control signal on the same subframe.

Furthermore, in FIG. 7, a single transmission power control mode may be applied to the varying channels. In this case, it is possible to remove TPC commands for DCI for DL assignments or TPC commands for UL grants.

Radio Communication System

Now, the structure of the radio communication system according to an embodiment of the present invention will be described below. In this radio communication system, the radio communication methods according to the above-described embodiments are employed. Here, although NB-LTE terminals will be shown as exemplary user terminals that are limited to using a narrow band as the band for their use, the present invention is by no means limited to NB-LTE terminals.

Figure 8:
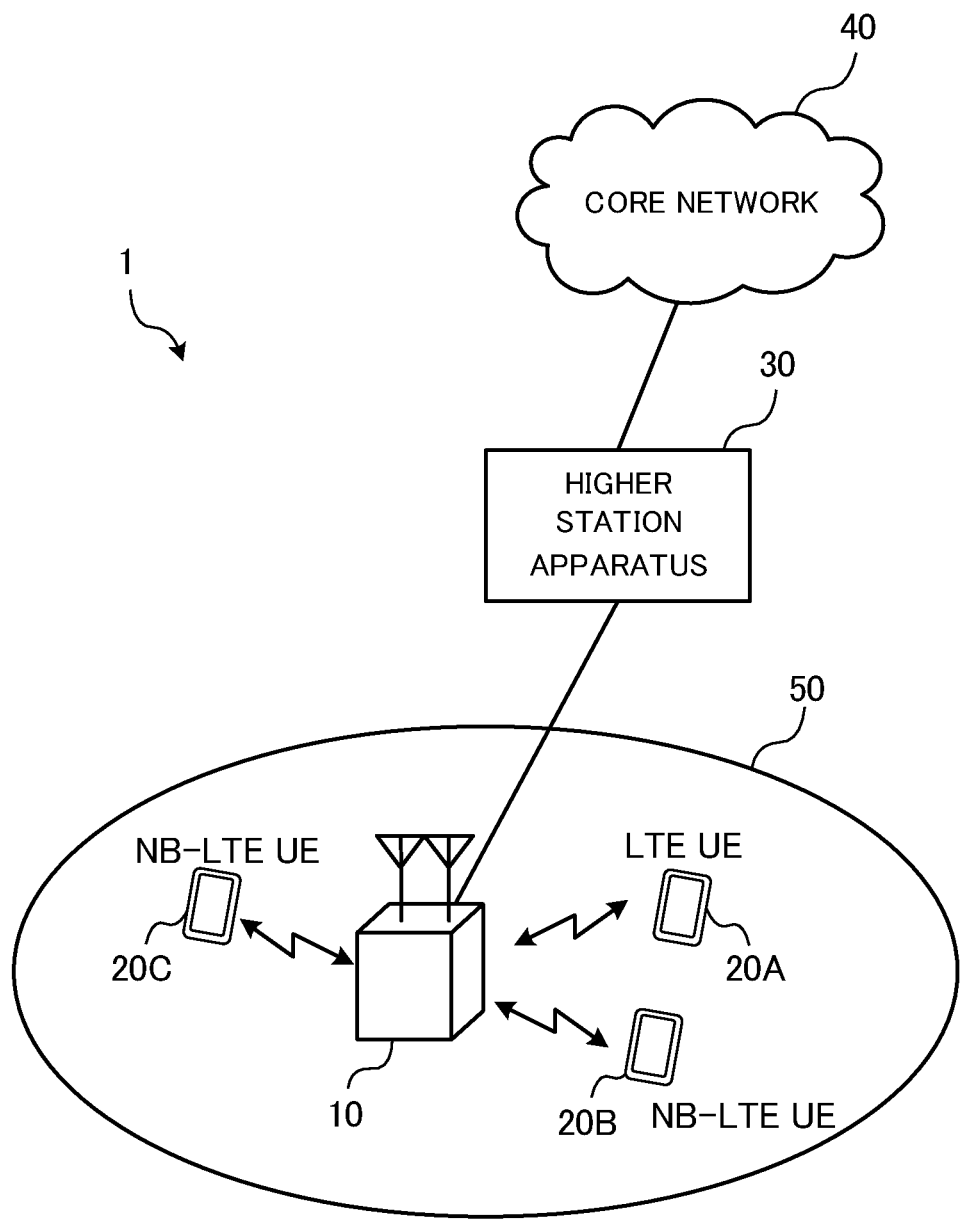
FIG. 8 is a diagram to show a schematic structure of a radio communication system according to an embodiment of the present invention.

FIG. 8 is a diagram to show a schematic structure of the radio communication system according to an embodiment of the present invention. The radio communication system 1 shown in FIG. 8 is an example of employing an LTE system in the network domain of a machine communication system. The radio communication system 1 can adopt carrier aggregation (CA) and/or dual connectivity (DC) to group a plurality of fundamental frequency blocks (component carriers) into one, where the system bandwidth of an LTE system constitutes one unit. Also, although it is assumed that the system band of this LTE system is configured to be minimum 1.4 MHz and maximum 20 MHz in both the downlink and the uplink, this configuration is by no means limiting.

Note that the radio communication system 1 may be referred to as "SUPER 3G," "LTE-A," (LTE-Advanced), "IMT-Advanced," "4G" (4th generation mobile communication system), "5G" (5th generation mobile communication system), "FRA" (Future Radio Access) and so on.

The radio communication system 1 is comprised of a radio base station 10 and a plurality of user terminals 20A, 20B and 20C that are connected with the radio base station 10. The radio base station 10 is connected with a higher station apparatus 30, and connected with a core network 40 via the higher station apparatus 30. Note that the higher station apparatus 30 may be, for example, an access gateway apparatus, a radio network controller (RNC), a mobility management entity (MME) and so on, but is by no means limited to these.

A plurality of user terminals 20 (20A to 20C) can communicate with the radio base station 10 in a cell 50. For example, the user terminal 20A is a user terminal that supports LTE (up to Rel-10) or LTE-Advanced (including Rel-10 and later versions) (hereinafter referred to as an "LTE terminal"), and the other user terminals 20B and 20C are NB-LTE terminals that serve as communication devices in machine communication systems. Hereinafter the user terminals 20A, 20B and 20C will be simply referred to as "user terminals 20," unless specified otherwise.

The NB-LTE terminal 20B and 20C are terminals that are limited to using a narrow band (for example, 200 kHz), which is narrower than the minimum system bandwidth supported in existing LTE system, as the band for their use.

Note that the NB-LTE terminals 20B and 20C are terminals that support various communication schemes including LTE and LTE-A, and are by no means limited to stationary communication terminals such electric meters, gas meters, vending machines and so on, and can be mobile communication terminals such as vehicles. Furthermore, the user terminals 20 may communicate with other user terminals 20 directly, or communicate with other user terminals 20 via the radio base station 10.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, the MIB (Master Information Blocks) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH is frequency-division-multiplexed with the PDSCH and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. The PUSCH may be referred to as an uplink data channel. User data and higher layer control information are communicated by the PUSCH. Also, downlink radio quality information (CQI: Channel Quality Indicator), delivery acknowledgment information (ACKs/NACKs) and so on are communicated by the PUCCH. By means of the PRACH, random access preambles for establishing connections with cells are communicated.

The channels for MTC terminals/NB-LTE terminals may be represented by affixing an "M," which stands for MTC, or an "N," which stands for NB-LTE, or an "NB," and, for example, an EPDCCH, a PDSCH, a PUCCH and a PUSCH for MTC terminals/NB-LTE terminals may be referred to as an "MPDCCH," an "MPDSCH," a "MPUCCH," and an "MPUSCH," respectively.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that, DMRSs may be referred to as "user terminal-specific reference signals" (UE-specific Reference Signals). Also, the reference signals to be communicated are by no means limited to these.

<Radio Base Station>

Figure 9:
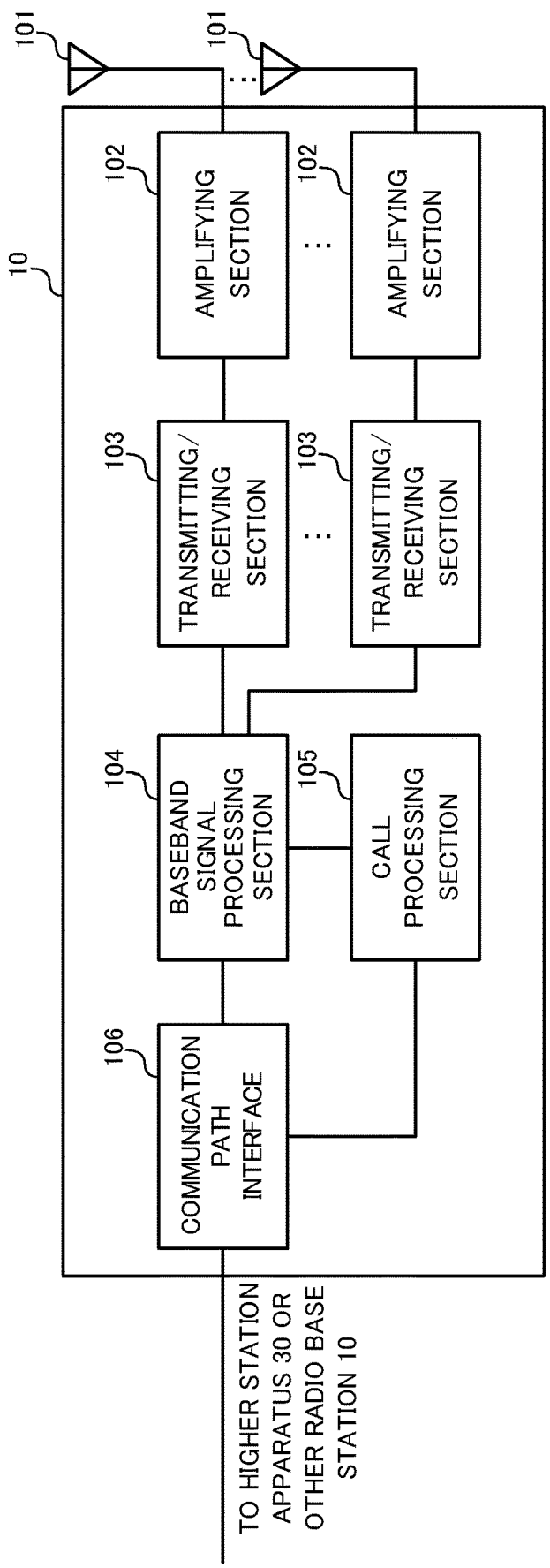
FIG. 9 is a diagram to show an example of an overall structure of a radio base station according to an embodiment of the present invention.

FIG. 9 is a diagram to show an example of an overall structure of a radio base station according to an embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that the transmitting/receiving sections 103 are comprised of transmitting sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as an RLC retransmission control transmission process, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

The transmitting/receiving sections 103 receive downlink signals, and, furthermore, transmit uplink signals. The downlink signals include downlink control signals (for example, the PDCCH/EPDCCH/MPDCCH), downlink data signals (for example, the PDSCH), downlink reference signals (for example, the CSI-RS (Channel State Information-Reference Signal), the CRS (Cell-specific Reference Signal)) and so on. The uplink signals include uplink control signals (for example, the PUCCH), uplink data signals (for example, the PUSCH), uplink reference signals (for example, the SRS (Sounding Reference Signal), the DM-RS (DeModulation-Reference Signals)) and so on.

To be more specific, each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. The transmitting/receiving sections 103 can transmit and receive various signals in a narrower band (narrow band) (for example, 200 kHz) than the minimum system bandwidth (1.4 MHz) for LTE systems.

For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a pre-determined interface. Also, the communication path interface 106 may transmit and/or receive signals (backhaul signaling) with other radio base stations 10 via an inter-base station interface (for example, an interface in compliance with the CPRI (Common Public Radio Interface), such as optical fiber, the X2 interface, etc.).

Figure 10:
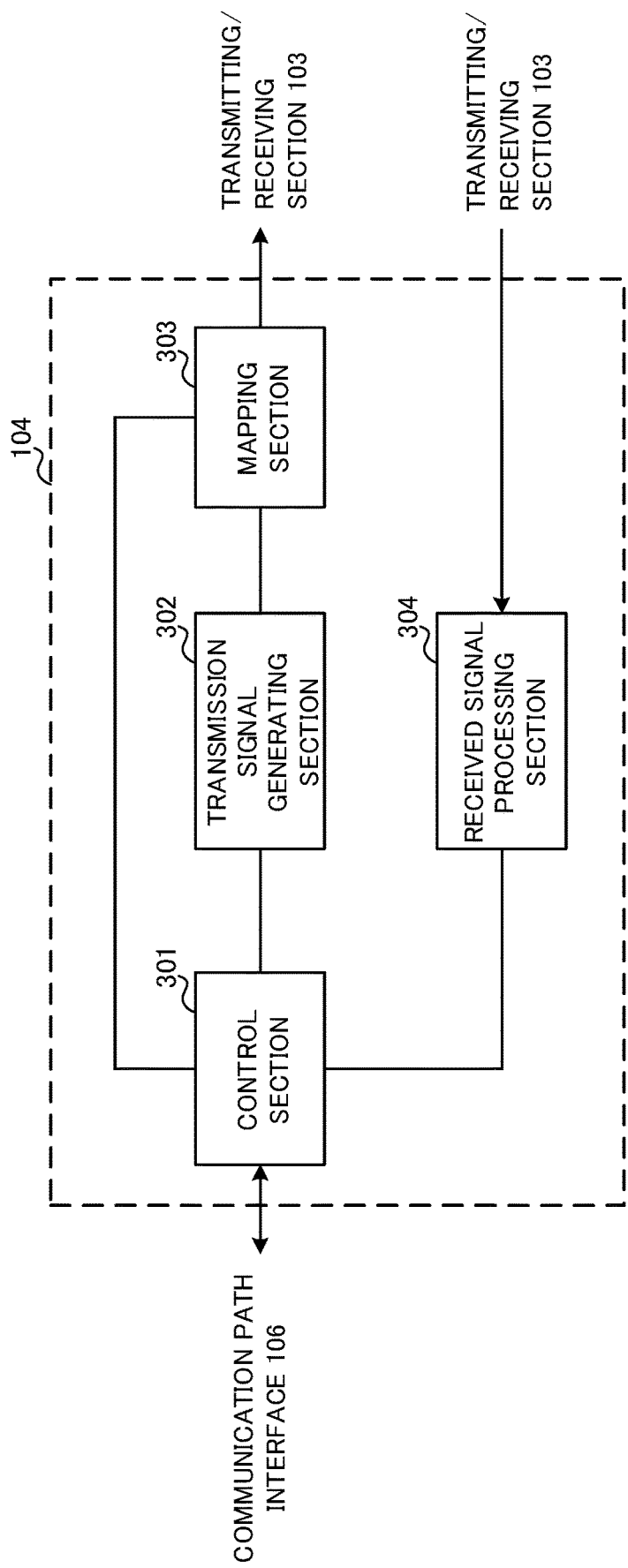
FIG. 10 is a diagram to show an example of a functional structure of a radio base station according to one embodiment of the present invention.

FIG. 10 is a diagram to show an example of a functional structure of a radio base station according to the present embodiment. Note that, although FIG. 10 primarily shows functional blocks that pertain to characteristic parts of the present embodiment, the radio base station 10 has other functional blocks that are necessary for radio communication as well. As shown in FIG. 10, the baseband signal processing section 104 has a control section 301, a transmission signal generating section 302, a mapping section 303 and a received signal processing section 304.

The control section 301 controls the scheduling (for example, resource allocation) of downlink data signals (PDSCH), downlink control signals (at least one of the PDCCH, the EPDCCH and the M-PDCCH). Also, the control section 301 controls the scheduling of system information, synchronization signals, and downlink reference signals (the CRS, the CSI-RS, the DM-RSs and so on). Furthermore, the control section 301 controls the scheduling of uplink reference signals (the SRS, the DMRS, etc.), uplink data signals (PUSCH), uplink control signals (PUCCH), random access preambles that are transmitted in the PRACH, and so on.

To be more specific, the control section 301 exerts control so that a downlink reference signal and a downlink data signal are time-division-multiplexed on different subframes. Also, the control section 301 may exert control so that a downlink control signal is multiplexed on a different subframe from those of the downlink reference signal and the downlink data signal. Furthermore, the control section 301 may exert control so that the downlink control signal is multiplexed with the downlink reference signal on the same subframe.

Also, the control section 301 may control the number of subframes where the downlink reference signal is multiplexed. The number of subframes can be controlled based on, for example, the number of access points, the coverage and so on. Also, the control section 301 may apply rate matching to the downlink data signal based on the presence of the CRS in subframes in which the downlink data signal is multiplexed.

Also, the control section 301 exerts control so that an uplink reference signal and an uplink data signal are time-division-multiplexed on different subframes. Also, the control section 301 may exert control so that an uplink control signal is multiplexed on a different subframe from those of the uplink reference signal and the uplink data signal. Furthermore, the control section 301 may exert control so that the uplink control signal is multiplexed with the uplink reference signal on the same sub frame.

The control section 301 may control the scheduling unit of downlink and/or uplink data signals. To be more specific, the control section 301 may switch the scheduling unit of downlink/uplink data signals from 6 subframes to a small number of subframes than 6 subframes. Furthermore, the control section 301 may exert control so that command information to command this switching is transmitted.

The control section 301 controls the transmission signal generating section 302 and the mapping section 303 to allocate various signals to narrow bands and transmit these to the user terminals 20. For example, the control section 301 exerts control so that the downlink reference signal, the downlink control signal (M-PDCCH), the downlink data signal (PDSCH) and so on are transmitted in a narrow band.

For the control section 301, a controller, a control circuit or a control device that can be described based on common understanding of the technical field to which the present invention pertains can be used.

The transmission signal generating section 302 generates downlink signals based on commands from the control section 301 and outputs these signals to the mapping section 303. For example, the transmission signal generating section 302 generates downlink grants (downlink assignments), which report downlink data signal allocation information, and uplink grants, which report uplink data signal allocation information, based on commands from the control section 301.

Also, the transmission signal generating section 302 generates a downlink control signal (M-PDCCH) that contains delivery acknowledgment information in response to an uplink data signal (PUSCH) based on a command from the control section 301.

For the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to pre-determined narrow band radio resources (for example, maximum 1 resource blocks) based on commands from the control section 301, and outputs these to the transmitting/receiving sections 103.

To be more specific, the mapping section 303 maps downlink signals to radio resources in pre-determined narrow bands following the frequency hopping patterns determined in the control section 301. For the mapping section 303, mapper, a mapping circuit or a mapping device that can be described based on common understanding of the technical field to which the present invention pertains can be used.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink data signals (PUSCH), uplink control signals (PUCCH), uplink reference signals (SRSs, DMRSs, etc.), higher layer control signals, etc.). The received signal processing section 304 outputs the received information to the control section 301.

Also, by using the received signals, the received signal processing section 304 may measure the received power (for example, RSRP (Reference Signal Received Power)), the received quality (for example, RSRQ (Reference Signal Received Quality)), channel states and so on. The measurement results may be output to the control section 301.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 11:
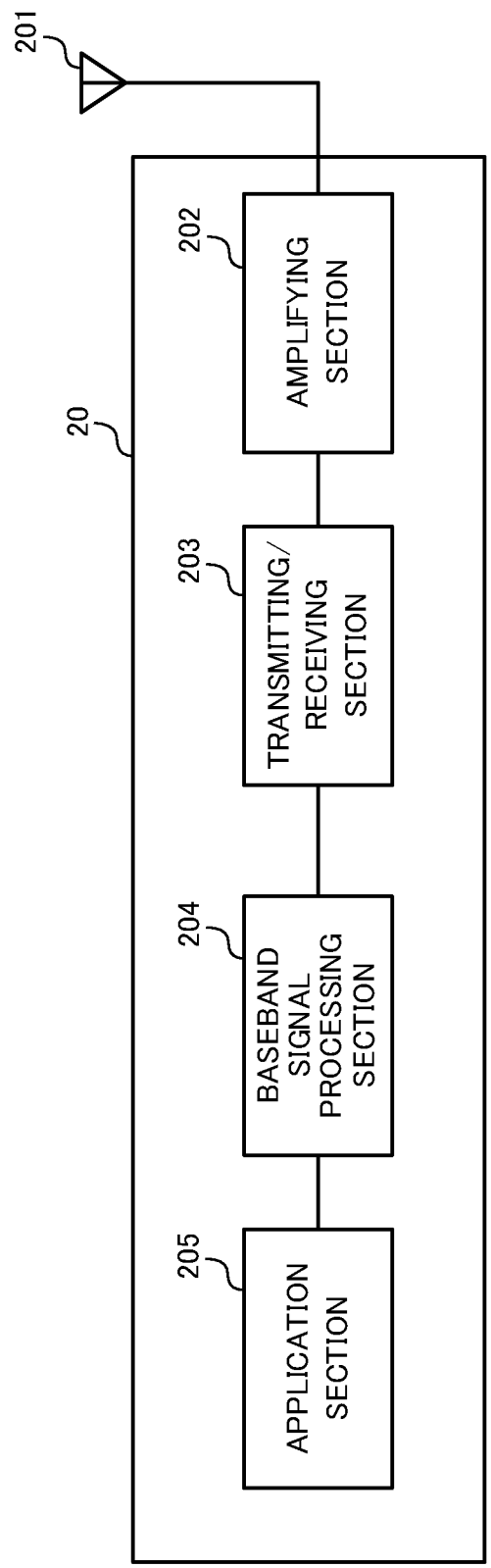
FIG. 11 is a diagram to show an example of an overall structure of a user terminal according to an embodiment of the present invention.

FIG. 11 is a diagram to show an example of an overall structure of a user terminal according to the present embodiment. Note that, although not described in detail herein, normal LTE terminals may operate to act as NB-LTE terminals. A user terminal 20 has a transmitting/receiving antenna 201, an amplifying section 202, a transmitting/receiving section 203, a baseband signal processing section 204 and an application section 205. Note that, the transmitting/receiving section 203 is comprised of a transmitting section and a receiving section. Also, the user terminal 20 may have a plurality of transmitting/receiving antennas 201, amplifying sections 202, transmitting/receiving sections 203 and/or others.

A radio frequency signal that is received in the transmitting/receiving antenna 201 is amplified in the amplifying section 202. The transmitting/receiving section 203 receives downlink signals amplified in the amplifying section 202 (including downlink control signals (PDCCH/EPDCCH/M-PDCCH), downlink data signals (PDSCH), downlink reference signals (CSI-RSs, CRSS, etc.) and so on. The received signals are subjected to frequency conversion and converted into the baseband signal in the transmitting/receiving section 203, and output to the baseband signal processing section 204.

To be more specific, the transmitting/receiving section 203 receives a starting index, which indicates the narrow band (frequency block) where a downlink signal (for example, the PDSCH) starts being allocated. This starting index may be included in DCI that is communicated in a downlink control signal (M-PDCCH), or may be included in higher layer control information.

Also, the transmitting/receiving section 203 may receive information that represents the number of subframes where downlink reference signals are multiplexed (first example). Also, the transmitting/receiving section 203 may receive command information that commands switching of the scheduling unit for downlink/uplink signals (second example). This command information may be included in DCI. Alternatively, switching may be commanded implicitly by using MCS indices or the TBS.

Furthermore, the transmitting/receiving section 203 transmits uplink signals (including uplink control signals (PUCCH), uplink data signals (PUSCH), uplink reference signals (DM-RSs, SRSs, etc.) and so on) that are output from the baseband signal processing section 204. For the transmitting/receiving sections 203, transmitters/receivers, transmitting/receiving circuits or transmitting/receiving devices that can be described based on common understanding of the technical field to which the present invention pertains can be used.

The baseband signal processing section 204 performs receiving processes for the baseband signal that is input, including an FFT process, error correction decoding, a retransmission control receiving process and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to the transmitting/receiving section 203. The baseband signal that is output from the baseband signal processing section 204 is converted into a radio frequency band in the transmitting/receiving section 203. The radio frequency signal that is subjected to frequency conversion in the transmitting/receiving section 203 is amplified in the amplifying section 202, and transmitted from the transmitting/receiving antenna 201.

Figure 12:
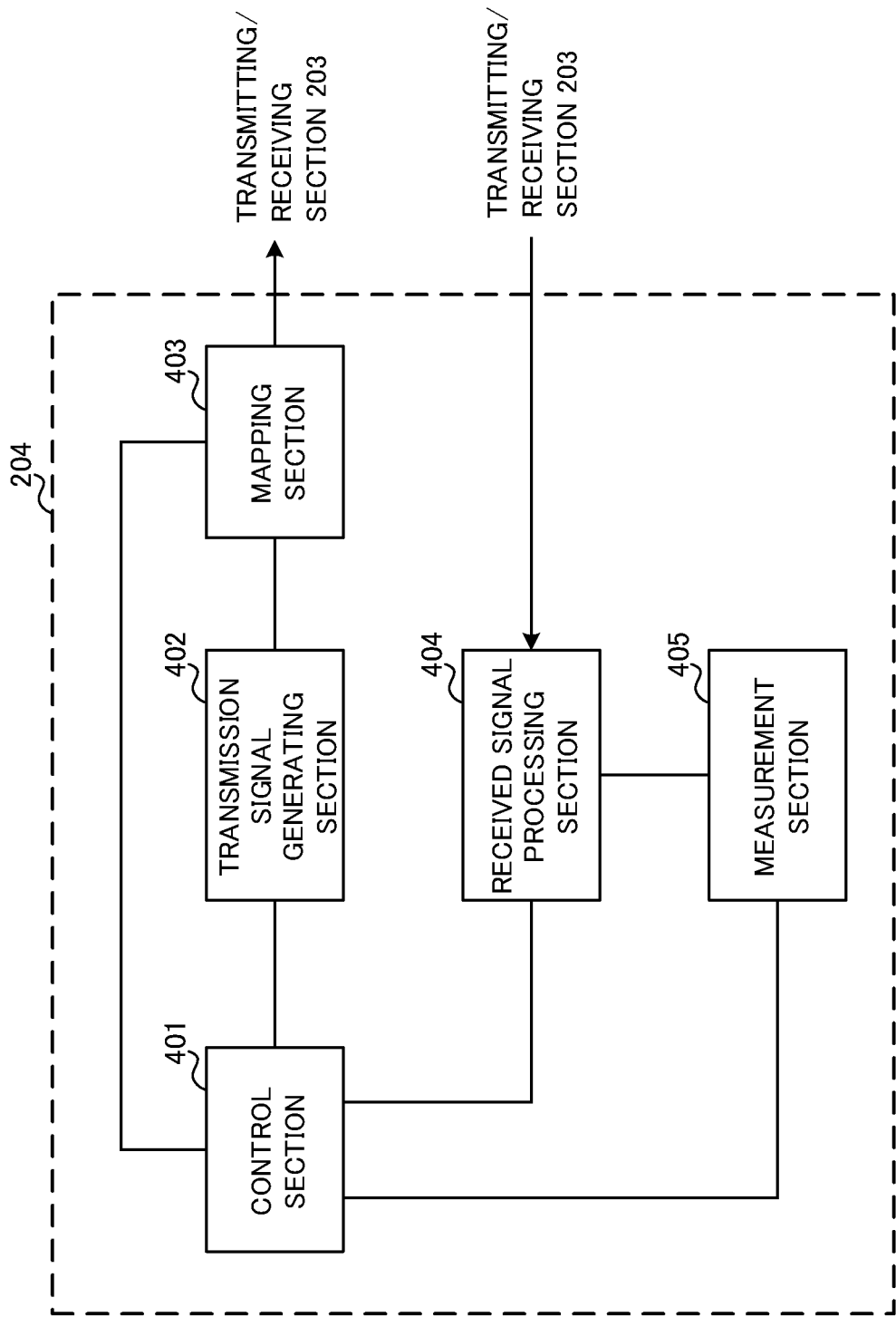
FIG. 12 is a diagram to show an example of a functional structure of a user terminal according to an embodiment of the present invention.

FIG. 12 is a diagram to show an example of a functional structure of a user terminal according to the present embodiment. Note that, although FIG. 12 primarily shows functional blocks that pertain to characteristic parts of the present embodiment, the user terminal 20 has other functional blocks that are necessary for radio communication as well. As shown in FIG. 12, the baseband signal processing section 204 provided in the user terminal 20 has a control section 401, a transmission signal generating section 402, a mapping section 403, a received signal processing section 404 and a measurement section 405.

The control section 401 controls the transmission signal generating section 402 and the mapping section 403. The control section 401 acquires the downlink control signals (PDCCH/EPDCCH/M-PDCCH) and downlink data signals (PDSCH), transmitted from the radio base station 10, from the received signal processing section 404. The control section 401 controls the generation of uplink control signals (PUCCH) and uplink data signals (PUSCH) based on the downlink control signals, the results of deciding whether or not retransmission control is necessary for the downlink data signals, and so on.

Also, the control section 401 controls the received signal processing section 404 and the transmitting/receiving section 203, and controls the receipt of downlink data signals based on downlink control signals.

To be more specific, the control section 401 may control the receipt (for example, decoding) of downlink data signals, to which rate matching has been applied based on the presence of cell-specific reference signals (CRSs).

Also, the control section 401 may control the scheduling unit of downlink/uplink data signals. To be more specific, the control section 401 may switch the scheduling unit of downlink/uplink data signals from 6 subframes to a small number of subframes than 6 subframes.

To be more specific, the control section 401 may switch the scheduling unit based on command information that commands switching of the scheduling unit, based on the MCS index of downlink data signals, or based on the transport block size (TBS) of downlink data signals.

For the control section 401, a controller, a control circuit or a control device that can be described based on common understanding of the technical field to which the present invention pertains can be used. Note that, the control section 401, combined with the measurement section 405, may constitute the measurement section of the present invention.

The transmission signal generating section 402 generates uplink signals based on commands from the control section 401, and outputs these signals to the mapping section 403. For example, the transmission signal generating section 402 generates an uplink control signal (PUCCH), which includes uplink control information (UCI), based on a command from the control section 401. The UCI may include at least one of delivery acknowledgment information (HARQ-ACK), channel state information (CSI) and a scheduling request (SR).

Also, the transmission signal generating section 402 generates an uplink data signal (PUSCH) based on a command from the control section 401. For example, when an uplink grant is included in a downlink control signal that is reported from the radio base station 10, the control section 401 commands the transmission signal generating section 402 to generate an uplink data signal.

For the transmission signal generating section 402, a signal generator, a signal generating circuit or a signal generating device that can be described based on common understanding of the technical field to which the present invention pertains can be used.

The mapping section 403 maps the uplink signals generated in the transmission signal generating section 402 to radio resources (maximum 6 resource blocks) based on commands from the control section 401, and outputs these to the transmitting/receiving sections 203. For the mapping section 403, mapper, a mapping circuit or a mapping device that can be described based on common understanding of the technical field to which the present invention pertains can be used.

The received signal processing section 404 performs receiving processes (for example, demapping, demodulation, decoding and so on) of received signals that are input from the transmitting/receiving sections 203. Here, the received signals include, for example, downlink signals transmitted from the radio base station 10 (downlink control signals (PDCCH/EPDCCH/M-PDCCH), downlink data signals (PDSCH) and so on), higher layer control signals and so on.

The received signal processing section 404 outputs the received information to the control section 401. The received signal processing section 404 outputs, for example, broadcast information, system information, RRC signaling, DCI and so on, to the control section 401. Also, the received signal processing section 404 outputs the received signals, the signals after the receiving processes and so on to the measurement section 405.

For the received signal processing section 404, a signal processor, a signal processing circuit or a signal processing device that can be described based on common understanding of the technical field to which the present invention pertains can be used. Also, the received signal processing section 404 can constitute the receiving section according to the present invention.

The measurement section 405 measures the CSI of a narrow band (frequency block), which is frequency-hopped in a pre-determined cycle, based on commands from the control section 401. The CSI includes at least one of a rank indicator (RI), a channel quality indicator (CQI) and a precoding matrix indicator (PMI). Also, the measurement section 405 may measure the received power (RSRP), the receive quality (RSRQ), and so on, by using received signals. Note that the processing results and the measurement results may be output to the control section 401.

For the received signal processing section 404, a signal processor/measurer, a signal processing/measurement circuit or a signal processing/measurement device that can be described based on common understanding of the technical field to which the present invention pertains can be used.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of the radio base station 10 and the user terminal 20 may be implemented by using hardware such as an ASIC (Application-Specific Integrated Circuit), a PLD (Programmable Logic Device), an FPGA (Field Programmable Gate Array) and so on. Also, the radio base stations 10 and user terminals 20 may be implemented with a computer device that includes a processor (CPU), a communication interface for connecting with networks, a memory and a computer-readable storage medium that holds programs. That is, the radio base stations and user terminals according to an embodiment of the present invention may function as computers that execute the processes of the radio communication method of the present invention.

Here, the processor and the memory are connected with a bus for communicating information. Also, the computer-readable recording medium is a storage medium such as, for example, a flexible disk, an opto-magnetic disk, a ROM (Read Only Memory), an EPROM (Erasable Programmable ROM), a CD-ROM (Compact Disc-ROM), a RAM (Random Access Memory), a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals 20 by running an operating system. Also, the processor reads programs, software modules and data from the storage medium into the memory, and executes various types of processes.

Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Also, software and commands may be transmitted and received via communication media. For example, when software is transmitted from a website, a server or other remote sources by using wired technologies such as coaxial cables, optical fiber cables, twisted-pair cables and digital subscriber lines (DSL) and/or wireless technologies such as infrared radiation, radio and microwaves, these wired technologies and/or wireless technologies are also included in the definition of communication media.

Note that the terminology used in this description and the terminology that is needed to understand this description may be replaced by other terms that convey the same or similar meanings. For example, "channels" and/or "symbols" may be replaced by "signals" (or "signaling"). Also, "signals" may be "messages." Furthermore, "component carriers" (CCs) may be referred to as "carrier frequencies," "cells" and so on.

Also, the information and parameters described in this description may be represented in absolute values or in relative values with respect to a pre-determined value, or may be represented in other information formats. For example, radio resources may be specified by indices.

The information, signals and/or others described in this description may be represented by using a variety of different technologies. For example, data, instructions, commands, information, signals, bits, symbols and chips, all of which may be referenced throughout the description, may be represented by voltages, currents, electromagnetic waves, magnetic fields or particles, optical fields or photons, or any combination of these.

The examples/embodiments illustrated in this description may be used individually or in combinations, and the mode of may be switched depending on the implementation. Also, a report of pre-determined information (for example, a report to the effect that "X holds") does not necessarily have to be sent explicitly, and can be sent implicitly (by, for example, not reporting this piece of information).

Reporting of information is by no means limited to the examples/embodiments described in this description, and other methods may be used as well. For example, reporting of information may be implemented by using physical layer signaling (for example, DCI (Downlink Control Information) and UCI (Uplink Control Information)), higher layer signaling (for example, RRC (Radio Resource Control) signaling, MAC (Medium Access Control) signaling, and broadcast information (the MIB (Master Information Block) and SIBs (System Information Blocks))), other signals or combinations of these. Also, RRC signaling may be referred to as "RRC messages," and can be, for example, an RRC connection setup message, RRC connection reconfiguration message, and so on.

The examples/embodiments illustrated in this description may be applied to LTE (Long Term Evolution), LTE-A (LTE-Advanced), SUPER 3G, IMT-Advanced, 4G, 5G, FRA (Future Radio Access), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), and other adequate systems, and/or next-generation systems that are enhanced based on these.

The order of processes, sequences, flowcharts and so on that have been used to describe the examples/embodiments herein may be re-ordered as long as inconsistencies do not arise. For example, although various methods have been illustrated in this description with various components of steps in exemplary orders, the specific orders that illustrated herein are by no means limiting.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-164237, filed on Aug. 21, 2015, including the specification, drawings and abstract, is incorporated herein by reference in its entirety.

The invention claimed is:

1. A terminal that communicates in a narrow band, which is narrower than a minimum bandwidth for use supported in an existing LTE (Long Term Evolution) system, the terminal comprising:
a receiver that receives downlink control information; and
a processor that controls a length of a time period of a scheduling unit for at least one of a downlink data signal and an uplink data signal that is using the narrow band based on command information that is included in the downlink control information and indicates the length of the time period of the scheduling unit,
wherein the processor controls the length as six or less, multiple subframes indicated by the command information.

2. The terminal according to claim 1, wherein the receiver receives the downlink control information by using a downlink control signal that is arranged in the narrow band.

3. The terminal according to one of claim 1, wherein the narrow band is comprised of one resource block.

4. A radio base station that communicates in a narrow band, which is narrower than a minimum bandwidth for use supported in an existing LTE (Long Term Evolution) system, the radio base station comprising:
a transmitter that transmits downlink control information; and
a processor that controls scheduling of at least one of a downlink data signal and an uplink data signal,
wherein the downlink control information includes command information that indicates a length of a time period of a scheduling unit and is used to control the length of the time period of the scheduling unit for at least one of the downlink data signal and the uplink data signal that is using the narrow band, and the length is controlled as six or less, multiple subframes indicated by the command information.

5. A radio communication method in a terminal for communicating in a narrow band, which is narrower than a minimum bandwidth for use supported in an existing LTE (Long Term Evolution) system, the radio communication method comprising:
receiving downlink control information; and
controlling a length of a time period of a scheduling unit for at least one of a downlink data signal and an uplink data signal that is using the narrow band based on command information that is included in the downlink control information and indicates the length of the time period of the scheduling unit, wherein the terminal controls the length as six or less, multiple subframes indicated by the command information.

6. The terminal according to one of claim 2, wherein the narrow band is comprised of one resource block.

* * * * *